Feb. 27, 1923.

B. W. HURD

ELECTRIC DRIVEN PUMP AND BLOWER SET

Filed July 20, 1921

1,446,800

WITNESSES:

INVENTOR.

Benjamin W. Hurd.

Patented Feb. 27, 1923.

1,446,800

UNITED STATES PATENT OFFICE.

BENJAMIN W. HURD, OF SAN FRANCISCO, CALIFORNIA, ASSIGNOR TO TURBINE FUEL OIL BURNER CO., OF SAN FRANCISCO, CALIFORNIA, A CORPORATION OF NEVADA.

ELECTRIC-DRIVEN PUMP AND BLOWER SET.

Application filed July 20, 1921. Serial No. 486,204.

*To all whom it may concern:*

Be it known that I, BENJAMIN W. HURD, a citizen of the United States, residing at San Francisco, in the county of San Francisco and State of California, have invented a new and useful Improvement in Electric-Driven Pump and Blower Sets, of which the following is a specification.

This invention relates to pump and blower sets such as are used to furnish air under pressure and at the same time circulate or deliver oil or other liquid. The object of the invention is to provide an electric-driven set of few parts, simple in construction and one taking up the minimum amount of floor space; the blower and pumping sets as made at the present time consist of numerous units connected together with solid or flexible couplings making a cumbersome and expensive machine.

Figure 1:
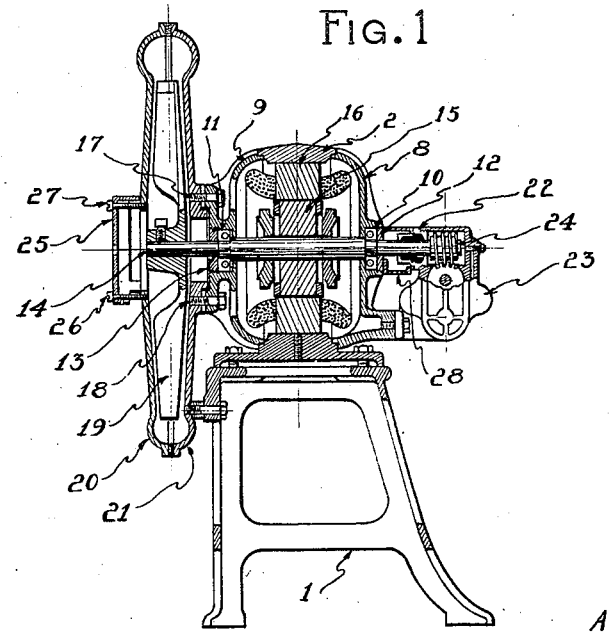
Figure 2:
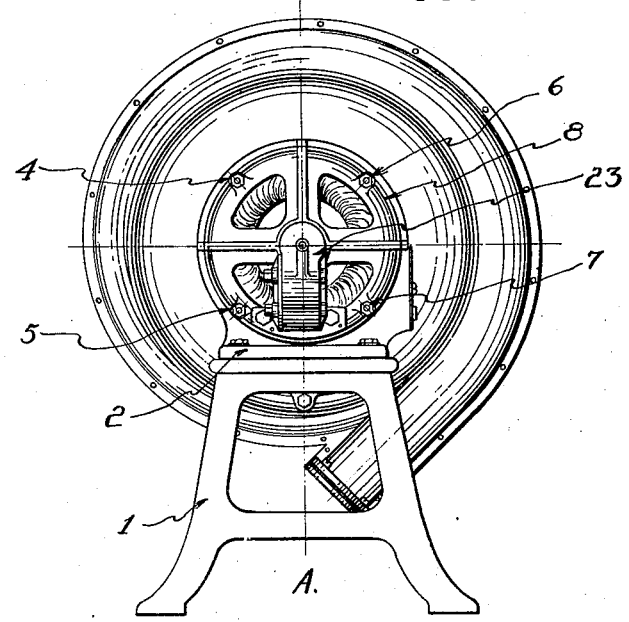

Referring to the accompanying drawings that illustrate the invention, Fig. 1, is the side elevation of the machine broken away on line A A, Fig. 2. Fig. 2, is a rear elevation showing pump, motor, base, and blower case. Similar numerals refer to similar parts throughout the several views. 1, is the base or pedestal on which is fastened motor frame 2; to frame 2, is fastened by suitable bolts 4, 5, 6 and 7, the motor end-shields 8 and 9; forming a motor housing in the end-shields 8 and 9, are mounted bearings 10 and 11, through which passes shaft 14; bearings 10 and 11 are held in place by lock nuts 12 and 13; on shaft 14, is mounted rotor 15, which revolves inside stator 16; to end-shield 8, is fastened pump 23, operated by worm 24; 24, is fastened to shaft 14; packing-gland 22, prevents leakage around shaft 14; to end-shield 9, is fastened blower case 21, by means of bolts, two of which 17 and 18, are shown in Fig. 1. 19, is a multi-bladed fan fastened to shaft 14, and rotates inside blower cases 20 and 21; blower case 20, being held to 21, by screws around outside rim of the blower cases. 25, is a cover over air inlet in blower case 20, and is held in place by screws 26 and 27. 28, is a drip pan under packing gland 22.

The invention claimed is:

A portable set including an electric motor field ring, field ring end members secured to the opposite ends thereof, an armature shaft extending through the field ring and projecting beyond the end members, bearings in the respective end members in which said shaft is journalled, a blower casing carried by one end member, a blower therein and mounted on one end of the armature shaft, a pump casing carried by the other end member, a pump therein, an operating connection between the pump and the other end of said armature shaft and a portable pedestal upon which said motor field ring rests with said blower casing and pump casing overhanging opposite sides thereof, said pedestal permitting the movement of the set from place to place as an unit.

BENJAMIN W. HURD.

Witnesses:
 EDGAR Z. VOGEL,
 HATTIE COHEN.